US009723540B2

(12) United States Patent
Brisebois et al.

(10) Patent No.: US 9,723,540 B2
(45) Date of Patent: Aug. 1, 2017

(54) BLUETOOTH-ENABLED FEMTO ACCESS CONTROL

(75) Inventors: Arthur Richard Brisebois, Cumming, GA (US); Mark Causey, Tucker, GA (US); Adrianne Luu, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 1235 days.

(21) Appl. No.: 12/857,133

(22) Filed: Aug. 16, 2010

(65) Prior Publication Data

US 2012/0040639 A1    Feb. 16, 2012

(51) Int. Cl.
*H04W 48/02* (2009.01)
*H04W 84/04* (2009.01)

(52) U.S. Cl.
CPC .......... *H04W 48/02* (2013.01); *H04W 84/045* (2013.01); *Y02B 60/50* (2013.01)

(58) Field of Classification Search
USPC ..... 455/41.2, 435.1, 41.1, 436–444; 370/331
See application file for complete search history.

(56) References Cited

U.S. PATENT DOCUMENTS

| | | | |
|---|---|---|---|
| 7,613,425 B2 | 11/2009 | Tailor | |
| 8,238,921 B2 * | 8/2012 | Chang | H04W 48/08 370/331 |
| 8,320,965 B2 | 11/2012 | Kwun et al. | |
| 8,588,698 B2 * | 11/2013 | Brisebois | H04W 88/06 455/63.1 |
| 8,897,277 B2 * | 11/2014 | Kalhan | H04W 48/08 370/338 |
| 2004/0009748 A1 * | 1/2004 | Heinonen | H04W 8/005 455/41.2 |
| 2005/0215233 A1 * | 9/2005 | Perera | H04W 12/06 455/411 |
| 2008/0039136 A1 * | 2/2008 | Byun | 455/557 |
| 2008/0134281 A1 | 6/2008 | Shinde et al. | |
| 2009/0042593 A1 | 2/2009 | Yavuz et al. | |
| 2009/0092097 A1 * | 4/2009 | Nylander et al. | 370/331 |
| 2009/0163216 A1 * | 6/2009 | Hoang et al. | 455/450 |
| 2009/0247170 A1 * | 10/2009 | Balasubramanian et al. | 455/445 |

(Continued)

OTHER PUBLICATIONS

Office Action dated Feb. 21, 2013 for U.S. Appl. No. 12/869,228, 14 pages.

*Primary Examiner* — Steven Kelley
(74) *Attorney, Agent, or Firm* — Amin, Turocy & Watson, LLP

(57) ABSTRACT

A low-cost system and methodology that facilitates improved femto access control by employing Bluetooth® technology is provided. Bluetooth-based femto access control utilizes a Bluetooth modem in a femto access point (FAP) that broadcasts a unique Bluetooth identity (ID). Nearby UEs can detect the femtocell and employ the Bluetooth ID for idle mode reselection and active mode handover behavior. Specifically, on detecting a femtocell, a UE can perform Bluetooth pairing with the FAP prior to performing attachment signaling. Moreover, only if Bluetooth signaling is successful, the UE proceeds to attach to the FAP. Thus, the system and method disclosed herein can control the UEs that attach to the femtocell, thereby reducing the signaling load and improving battery life of the UEs.

20 Claims, 12 Drawing Sheets

(56) References Cited

U.S. PATENT DOCUMENTS

| | | | |
|---|---|---|---|
| 2009/0271846 A1* | 10/2009 | Desplanques | H04W 12/06 726/4 |
| 2010/0016022 A1* | 1/2010 | Liu et al. | 455/561 |
| 2010/0190498 A1* | 7/2010 | Ha et al. | 455/435.1 |
| 2010/0214977 A1* | 8/2010 | Hegde | 370/328 |
| 2010/0222000 A1* | 9/2010 | Sauer | G06F 9/4443 455/41.2 |
| 2010/0222054 A1* | 9/2010 | Abraham | H04W 48/20 455/434 |
| 2011/0194530 A1* | 8/2011 | Tinnakornsrisuphap | H04W 36/04 370/331 |
| 2011/0250842 A1* | 10/2011 | Stafford et al. | 455/41.2 |
| 2011/0263258 A1* | 10/2011 | Soliman | H04W 36/04 455/436 |
| 2012/0026865 A1* | 2/2012 | Fan | H04W 76/02 370/225 |
| 2012/0033611 A1* | 2/2012 | Wu | H04W 24/02 370/328 |

* cited by examiner

BLUETOOTH-ENABLED FEMTO ACCESS CONTROL

CROSS-REFERENCE TO RELATED APPLICATIONS

The subject application is related to co-pending U.S. patent application Ser. No. 12/869,228, entitled "BLUETOOTH-ENABLED FEMTO PILOT GATING," and filed on Aug. 26, 2010. The entirety of this application is incorporated herein by reference.

TECHNICAL FIELD

The subject disclosure relates to wireless communications and, more particularly, to a mechanism, that provides Bluetooth-enabled femto access control for reducing complex handover signaling and extending user equipment (UE) battery life.

BACKGROUND

Femtocells—building-based wireless access points interfaced with a wired broadband network—are traditionally deployed to improve indoor wireless coverage, and to offload traffic from a mobility radio access network (RAN) operated by a wireless service provider. Improved indoor coverage includes stronger signal, increased bandwidth, and improved reception (e.g., video, sound, or data), ease of session or call initiation, and session or call retention, as well. Offloading traffic from a RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Traditionally, during idle mode reselection and/or active mode handover, a user equipment (UE) can trigger a carrier frequency scan to detect a femto access point (FAP). Moreover, the UE can perform attachment signaling, for example, including a Location Area Update (LAU) and/or Routing Area Update (RAU). Moreover, attachment attempts are a part of procedures to ensure mobility, so voice calls and sessions can continue even after a macro-to-femto transition or vice versa. If the attachment attempt is unsuccessful (e.g., the UE is not authorized to utilize the femtocell network), the UE can be commanded to select another location area code (LAC)/routing area code (RAC). This attempt and handling process can occupy significant UE battery, and FAP capacity and signaling resources.

Moreover, the traditional femto access control and incoming handovers are signaling-intensive and limited in the number of unique access point (AP) identifiers available. Upon discovery of new AP, the UE performs extensive signaling activity with many network elements before access is accepted or denied. Especially in the cases where the access is denied, the extensive signaling activity provides substantial amount of overhead. Further, as femtocell networks become denser and complex, this substantial amount of signaling activity can degrade network capacity and UE battery performance.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate efficient attachment of a user equipment (UE) to a femto access point (FAP), in a manner such that, UE battery life and femto network capacity is improved. In particular, the FAP and the UE can include Bluetooth modems, which can facilitate Bluetooth pairing, prior to performing attachment signaling. Moreover, UEs that are authorized to connect to the FAP can be provided with most any secret code that can enable Bluetooth pairing between the FAP and the UE. During cell reselection (e.g., in idle and/or active mode), the UE can attempt Bluetooth pairing with the FAP, prior to performing attachment signaling. Further, only on successful Bluetooth pairing does the UE complete a Location Area Update (LAU) and/or Routing Area Update and attach to the FAP. If Bluetooth pairing is unsuccessful, the UE determines that it is not authorized to communicate via the FAP and does not attempt to attach to the FAP.

Another aspect of the disclosed subject matter relates to a method that can be employed to facilitate improved femto access control that reduces signaling load and improves battery life of UEs. The method comprises, a UE, detecting a femtocell, for example, based on the location area code (LAC) of the femtocell. Further, the method includes activating a Bluetooth receiver (e.g., within the UE) and performing Bluetooth pairing with a Bluetooth modem associated with the FAP, prior to performing an attachment attempt to camp onto the femtocell. In one example, UEs authorized to employ the femtocell can be provided with a passkey for successful Bluetooth pairing. Accordingly, only if Bluetooth pairing is successfully completed, attachment signaling is performed.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
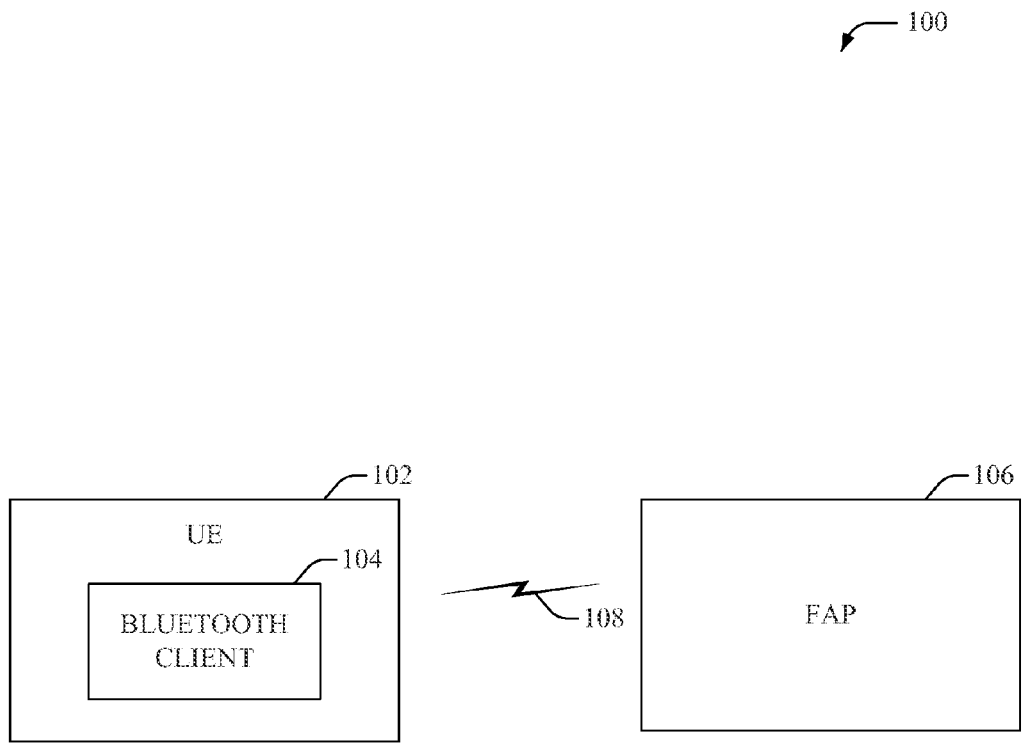
FIG. 1 illustrates an example system that provides Bluetooth-enabled femto access control.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "client," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, communications media or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell", and "femto" are utilized interchangeably, while "macro cell" and "macro" are utilized interchangeably herein. Similarly, the terms "femtocell access point", "femtocell" and "femto access point" are also utilized interchangeably.

Further, the terms "user," "subscriber," "customer," and the like are employed interchangeably throughout the subject specification, unless context warrants particular distinction(s) among the terms. It should be appreciated that the aforementioned terms can refer to human entities or automated components supported through artificial intelligence (e.g., a capacity to make inference based on complex mathematical formalisms), which can provide simulated vision, sound recognition and so forth. In addition, the term friend, as disclosed herein refers to an entity, such as, but not limited to, a human entity, an automated component, and/or a user equipment associated with the human entity and/or automated component.

Conventional femto systems employ extensive attachment signaling, including, a Location Area Update (LAU) and/or Routing Area Update (RAU) with each user equipment (UE) that attempts to connect to the femto network. Moreover, on discovery of a femto access point (FAP), a UE performs extensive signaling activity with various network elements before access is granted or prohibited. As femto networks become more dense and complex, the extensive signaling activity can degrade network capacity and UE battery performance. Aspects disclosed herein relate to Bluetooth-based femto access control, which can significantly reduce signaling load and offer improved control over subscriber access to the FAP for idle and/or active mode reselection and/or handover.

Aspects, features, or advantages of the subject innovation can be exploited in substantially any wireless communication technology; e.g., Universal Mobile Telecommunications System (UMTS), Global System for Mobile Communications (GSM), Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that can provide Bluetooth-enabled femto access control, according to an aspect of the subject innovation. In one aspect, a UE 102 can detect a femtocell and attempt to attach to the femto network, for example, by employing Bluetooth client 104. Typically, the UE 102 can include most any electronic device, such as, but not limited to, media players, digital cameras, media recorders, laptops, cell phone, PDAs (personal digital assistants), personal computers, printers, scanners, digital photo frames, GPS module, gaming module, etc. Further, the UE 102 can also include most any LTE-based appliances that can employed, for example, in a home, office, building, retail store, restaurant, hotel, factory, warehouse, etc., such as, but not limited to, heating or cooling unit, lighting unit, washing machine, dryer, dishwasher, refrigerator, oven, stove, etc. It can be appreciated that the UE 102 can be mobile (e.g. cellular phone), have limited mobility (e.g. desktop computer) and/or be stationary (e.g. air conditioning unit).

According to an embodiment, the femtocell can be served by a femto access point (FAP) 106 that manages femto access. As an example, the FAP 106 can be deployed in most any location, such as, but not limited to, a home, a workshop, an office, an airport, a library, a hospital, a retail store, salon, grocery store, etc. Typically, the FAP 106 can communicate with the UE 102 to grant/deny femto access to the UE 102. In one aspect, the UE 102 can include a Bluetooth client 104 that facilitates idle mode reselection and/or active mode handover behavior by employing Bluetooth technology, as explained infra. Bluetooth® technology provides a method to connect and exchange information between devices via a secure, globally unlicensed short-range radio frequency.

Moreover, the FAP 106 and the UE 102 can include Bluetooth modems, which can facilitate Bluetooth pairing 108, before attachment signaling is performed. Pairing, as disclosed herein, is a process by which two or more devices (e.g., UE 102 and FAP 106) associate themselves with one another to create a Bluetooth type connection. Typically, the two devices can employ a shared password/code that can be employed for future communication between the devices. After pairing, connections between the two devices are authenticated automatically. In accordance with an aspect, only those UEs (e.g., UE 102) that are authorized to connect to the femto network can be provided with the shared password. Moreover, the UE 102 can determine whether femto access will be granted or denied based on the Bluetooth pairing, prior to an attachment signaling attempt. Therefore, only if the Bluetooth pairing is successful, attachment signaling is performed by the UE 102.

In one aspect, the Bluetooth modem (not shown) of FAP 106 can comprise a unique identifier, such as, but not limited to, an address or location of the FAP 106, FAP owner's name, etc. The unique identifier associated with the FAP 106 can be provided to a UE, e.g., UE 102, that is authorized to communicate over the femto network (e.g., during setup or at most any other time). During cell reselection (e.g., in idle and/or active mode), the UE 102 can active the Bluetooth client 104, which can perform a scan for a registered Bluetooth transmitter. Since UE 102 is authorized by the FAP 106, Bluetooth pairing 108 can be successfully established (e.g., employing the unique identifier or most any password/code) by the Bluetooth client 104. Further, on successful Bluetooth pairing 108, the UE 102 can complete LAU/RAU and attach to the FAP 106 by employing most any process.

Figure 2:
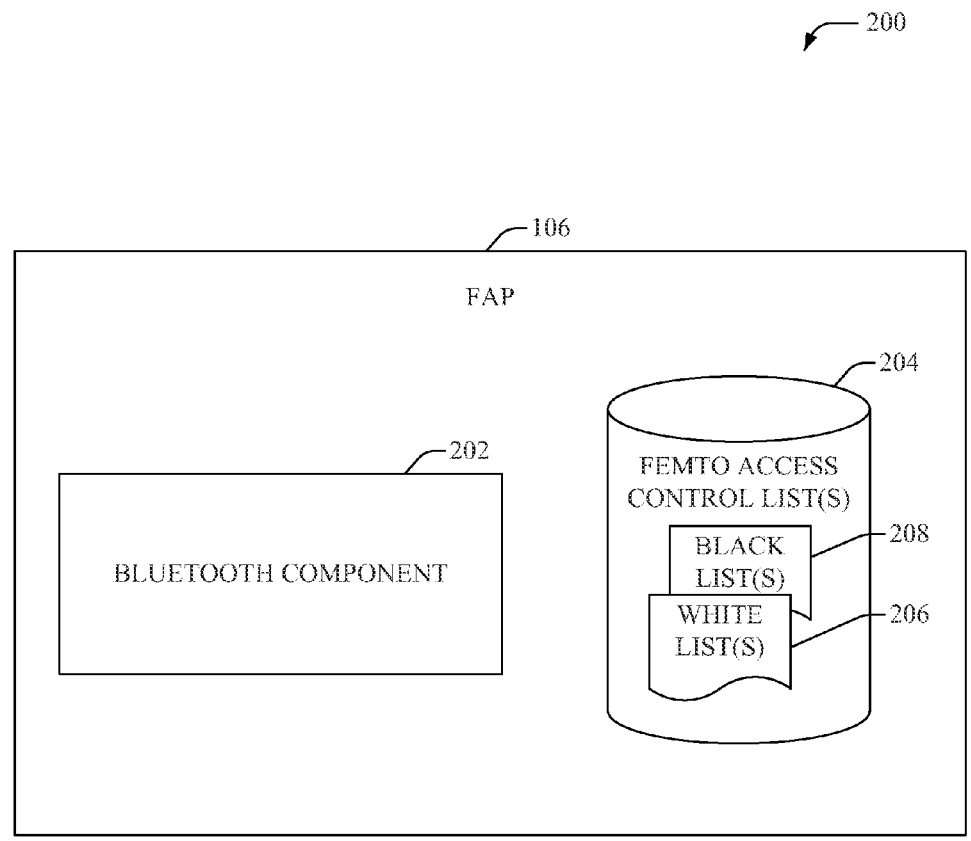
FIG. 2 illustrates an example system that can be employed for controlling access to a femtocell by employing Bluetooth® technology.

Referring to FIG. 2, there illustrated is an example system 200 that can be employed for controlling access to a femtocell by employing Bluetooth® technology in accordance with an aspect of the subject disclosure. In one embodiment, a Bluetooth component 202 can be utilized by the FAP 106 to facilitate femto access control. Typically, the Bluetooth component 202 can reside within the FAP 106 (as shown in FIG. 2), and/or be operatively coupled to the FAP 106. It can be appreciated that the FAP 106 can include functionality, as more fully described herein, for example, with regard to system 100.

In addition to the cellular technology transceivers, the FAP 106 can include a Bluetooth modem with a unique identifier, for example within the Bluetooth component 202. As an example, the unique identifier can be 8-128 bits long and/or can include FAP address, homeowner name, name of location where the FAP is deployed, etc. In one aspect, the identifier can be utilized as a password to establish Bluetooth communication with a UE. Typically, Bluetooth communication employs frequency-hopping spread spectrum, which transmits data on up to 79 bands of 1 MHz width in the range 2402-2480 MHz. Moreover, this frequency range in the globally unlicensed Industrial, Scientific and Medical (ISM) 2.4 GHz short-range radio frequency band, and thus does not cause interference in cellular communication.

In general, the Bluetooth communication utilizes a packet-based protocol with a master-slave structure. For example, the FAP 106 can be a master and can communicate with up to seven slaves (e.g., UEs) in a piconet. Further, the Bluetooth communication provides a secure way to connect and exchange information between the FAP 106 and a UE (e.g., UE 102). Bluetooth® specifications are developed by the Bluetooth Special Interest Group (SIG), for example, Bluetooth Core Specification Version 3.0+HS, and Bluetooth Core Specification Version 4.0, which are incorporated by reference herein.

Referring back to FIG. 2, the FAP 106 further includes an access control list 204 (e.g., white lists 206, black lists 208, etc.), that can be employed to provide access to femto cell service. Such access control list 204 can be configured through various apparatuses and in various modes, e.g., interactively or automatically, which facilitate access management of access to femto cell coverage. White list(s) 206 can include a set of subscriber station(s) identifier numbers, codes or tokens, and can also include additional fields that can contain information respectively associated with communication devices to facilitate femto cell access management based at least in part on desired complexity; for instance, an additional field in a white list can be a logic parameter that determines whether an associated identifier is available for dissemination across disparate white lists. Black list(s) 208 can include a single attribute field, which uniquely identifies a mobile device; the identified device is denied femto access service. Values of attribute fields that determine white list(s) 206 or black list(s) 208 can be generated through various sources, for example, automatically or based on user input. Typically, the access control list 204 can be most any relational database table that includes a set of one or more fields for each attribute in the tables. It is noted, however, that other table models (e.g., hierarchical, object oriented) can be employed to define the friends list. Moreover, the access control list 204 can include N entries, wherein N can be most any natural number from 1 to infinity. According to an aspect, information from the access control list 204 can be utilized to determine UEs that are authorized to communicate via the femtocell and to which the Bluetooth password can be communicated for Bluetooth pairing (e.g., by the Bluetooth component 202).

Further, it can be appreciated that the femto access control list 204 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 3:
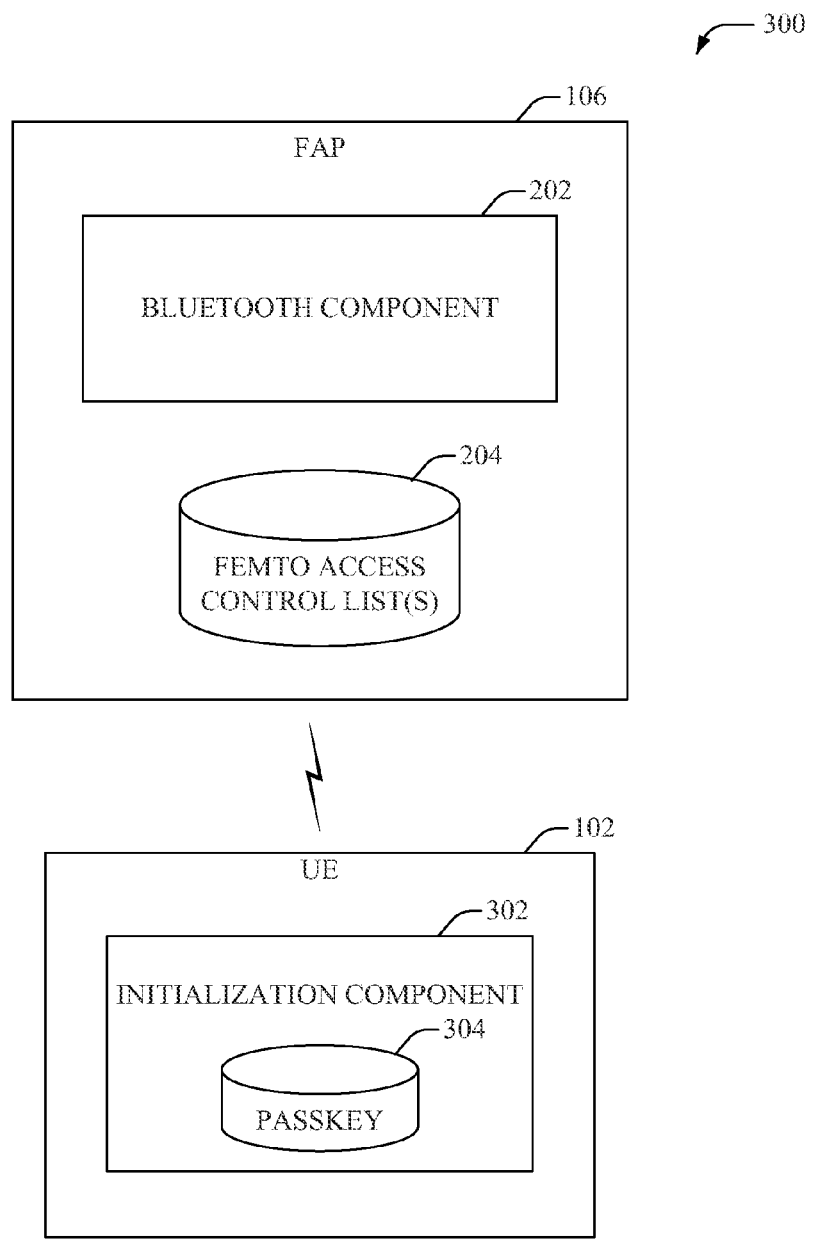
FIG. 3 illustrates an example system that employs Bluetooth communication to control the UEs that attempt to attach to a femtocell.

FIG. 3 illustrates an example system 300 that employs Bluetooth communication to control the UEs that attempt to attach to a femtocell, according to an aspect of the subject disclosure. It can be appreciated that the FAP 106, Bluetooth component 202 and UE 102 can include functionality, as more fully described herein, for example, with regard to system 100 and 200.

In one aspect, femto access control list 204 includes information associated with UEs that can be allowed or denied femto access. Typically, such information can be input by a femtocell owner and/or authorized user, or automatically determined. For UEs added to the femto access control list 204, such as, UE 102, the UE owner can perform a Bluetooth registration (via the initialization component 302) from their UE towards the specific FAP Bluetooth modem within the Bluetooth component 202. During registration (e.g., dynamically, during setup or most any other time), the initialization component 302 can receive and store a passkey 304 from the FAP 106 and/or via user input. In one aspect, the passkey can include most any secret code that can enable Bluetooth pairing between the FAP 106 and the UE 102. For example, the passkey can include a unique identifier (e.g., indicative of the FAP address/location, owner's name, etc.) associated with the Bluetooth component 202.

In one embodiment, FAP 106 can utilize a specific LAC (location area code) range, which can be pre-programmed as "FEMTO" in the UE 102. When the UE 102 detects a cell with a LAC within the FEMTO LAC range, the UE 102 can initially activate a Bluetooth receiver (e.g., within Bluetooth client 104). Next, the UE 102 can scan for a registered Bluetooth transmitter. Bluetooth component 202 in the FAP 106 transmits Bluetooth signals, which can be received by the UE 102. The UE can utilize the passkey 304 to facilitate Bluetooth pairing with the Bluetooth component 202. It can be appreciated that the subject disclosure is not limited to utilization of passkeys for Bluetooth pairing and most any pairing mechanism can be employed.

On detecting that Bluetooth pairing is successful, the UE 102 can complete a Location Area Update (LAU) and/or Routing Area Update (RAU) and attach to the FAP 106 using standard signaling. However, in an example scenario, wherein a UE within the femtocell range, is not authorized for femtocell access, an appropriate Bluetooth identifier (e.g., passkey 304) is not found and the Bluetooth pairing is unsuccessful. In this scenario, the UE can determine that access to the femto network will not be granted and thus, will not attempt to attach to FAP 106. Accordingly, unnecessary attachment signaling will be avoided and battery life of the UE can be extended.

Figure 4:
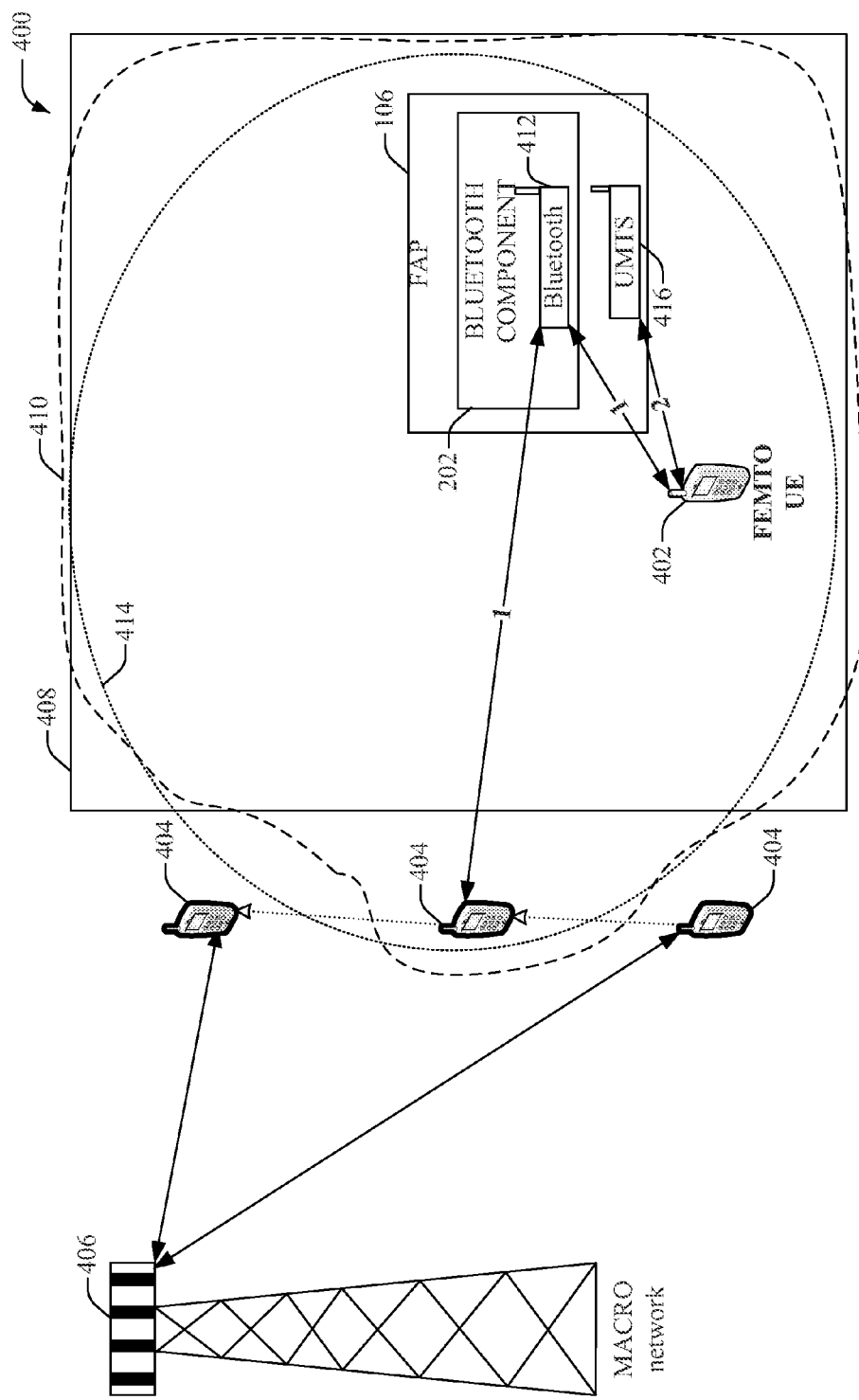
FIG. 4 illustrates an example system for improving user equipment (UE) battery life and femto network capacity.

FIG. 4 illustrates an example system 400 for improving UE battery life and femto network capacity, according to an aspect of the subject specification. It can be appreciated that the FAP 106 and Bluetooth component 202 can include functionality, as more fully described herein, for example, with regard to system 100, 200, and 300. Further, UEs 402, 404 can be substantially similar to UE 102 and can include functionality, as more fully described herein with respect to UE 102, in systems 100, 200, and 300.

According to an embodiment, FAP 106 is deployed within an area, for example, a home 408. The femtocell coverage area 410 can be determined, at least in part, by transmission power allocated to FAP 106, path loss, shadowing, and so forth. Coverage area 410 typically can be spanned by a coverage radius that ranges from 20 to 50 meters. The coverage area 410 is generally associated with an indoors area, or a building, which can span about 5000 sq. ft. In one aspect, FAP 106 can include a Bluetooth component 202, which comprises a Bluetooth modem 412. The Bluetooth modem 412 can perform pairing with UEs within the Bluetooth range 414. As an example, the Bluetooth range can be adjusted to overlap the femto coverage area 410 and/or the area of the home 408.

In an example scenario, wherein an authorized UE, for example UE 402, enters Bluetooth range 414, the UE 402 can initially perform Bluetooth pairing with the Bluetooth modem 412, before attempting to attach to the FAP 106. For example, when UE 402 enters the femtocell 410, the UE 402 can detect a cell 410 with LAC within the femto LAC range stored in the UE 402. In response, the UE 402 can activate a Bluetooth receiver and scan for a registered Bluetooth transmitter. Since, the UE 402 is authorized for femto access (e.g., information associated with the UE 402 is stored within a white list in the FAP 106), the Bluetooth pairing can be successfully performed. On determining that Bluetooth pairing was successful, the UE 402 can then complete attachment signaling (e.g., LAU/RAU) with the Universal Mobile Telecommunications System (UMTS) transmitter and attach to the FAP 106.

In another example scenario, consider an unauthorized UE, for example UE 404, that is passing by the home 408 (e.g., walking on a road outside the home 408, driving by on a road outside the home 408, etc.) Although illustrated as outside the home 408, it can be appreciated that the unauthorized UE 404 can also be located within the home 408. Moreover, UE 404 can be connected to a macro network via base station 406. Typically, when UE 404 enters the femtocell 410, the UE 404 can identify a LAC within the FEMTO LAC range stored in the UE 404. However, instead of directly performing attachment signaling (as in conventional systems), the UE 404 initially activates a Bluetooth receiver, for example, within UE 404, prior to initiating attachment signaling. Since UE 404 is not authorized for femtocell access (e.g., information associated with the UE 404 is stored within a black list in the FAP 106 and/or information associated with the UE 404 is not provided in a whitelist of the FAP 106), the UE 404 does not detect a registered Bluetooth transmitter. Accordingly, Bluetooth pairing between the Bluetooth modem 412 and UE 404 is unsuccessful. In response to the unsuccessful Bluetooth pairing, the UE 404 does not perform attachment signaling with the FAP 106. This is an improvement over traditional processes, which require a conventional UE to complete the entire LAU/RAU and/or handover process before determining whether the conventional UE is authorized to camp on the FAP. In this example scenario, unnecessary macro to femto handover signaling is reduced and/or avoided and thus battery life of UE 404 is conserved. In one aspect, to reduce interference and further reduce attachment signaling, the UMTS transceiver 416 can be activated only when Bluetooth pairing is successful. It can be appreciated that most any communication technology can be employed by FAP 106 and the subject specification is not limited to UMTS.

System 400 enables UEs (e.g., UE 402, 404) to identify whether the UE is authorized to camp on a detected femtocell prior to initiating attachment signaling. Moreover, system 400 allows only authorized UEs (e.g., UE 402) to attempt to attach (e.g., perform attachment signaling) to FAP 106. As an example, if a FAP is deployed in an area (e.g., condominium, apartment complex, house, office, etc.) that is located near an expressway or high traffic road, the FAP can receive a substantial number of attachment attempts from non-authorized UEs passing by on the expressway/road resulting in a significant impact on battery life and/or signaling load. System 400 enables a UE (e.g., UE 402, 402) to recognize whether a femtocell is a viable candidate for communication (e.g., by employing Bluetooth communication) and attempt to attach to the femtocell based on the recognition. For example, the UE (e.g., UE 402, 404) can identify if the UE is authorized to communicate over the femto network, by employing Bluetooth pairing, before attempting to attach to the FAP. Moreover, if the Bluetooth pairing is completed, the UE attempts to attach to the FAP. Alternately, UEs without Bluetooth pairing ignore the femtocell and do not perform attachment signaling. In one aspect, when the UE is in an idle mode, the Bluetooth-enabled femto access can be implemented by a modified selection/reselection behavior (e.g., ignore the carrier/LAC/SC combination). Further, when the UE is in an active mode, Bluetooth-enabled femto access can be implemented by employing modified neighbor measurement reporting behavior (e.g., report no measurements back to the served macro NodeB). This is an improvement over traditional systems wherein the UE performs the entire LAU/RAU and/or handover process before identifying whether the UE is authorized to communicate via the femto network.

Figure 5:
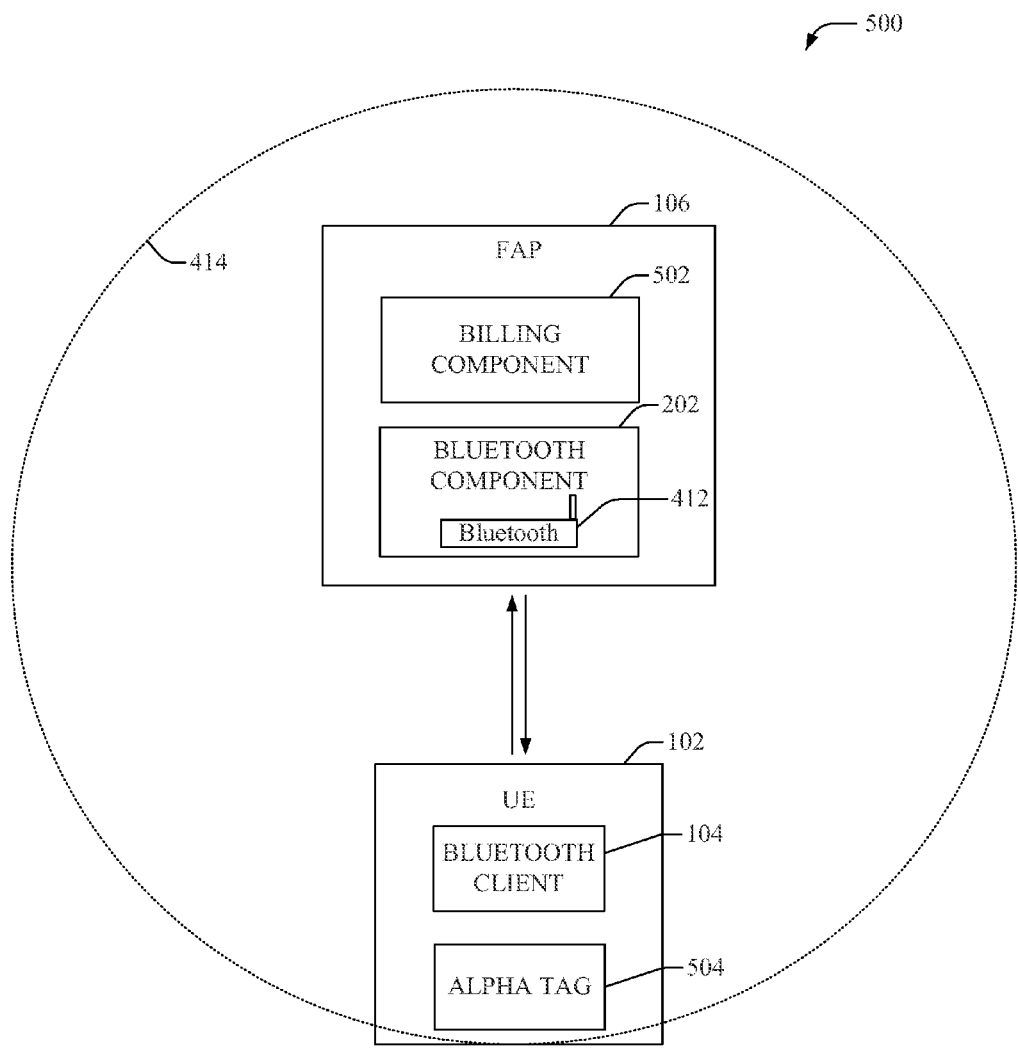
FIG. 5 illustrates an example system that facilitates accurate billing in a femto network by employing Bluetooth communication.

Referring to FIG. 5, there illustrated is an example system 500 that facilitates accurate billing in a femto network, in accordance with an aspect of the subject disclosure. It can be appreciated that the UE 102, FAP 106, Bluetooth client 104, Bluetooth component 202, and Bluetooth modem 412 can include functionality, as more fully described herein, for example, with regard to systems 100, 200, 300 and 400. Typically, various billing schemes for UE communication can be applied by a service provider. For example, the service provider can offer different billing rates for communication over the femto network and the macro network. Typically, communication over the femto network can be free or at a reduced rate.

Oftentimes a UE does not switch to the femto network from the macro network until the UE is substantially close to the FAP. As an example, if a FAP deployed in a house, is located at one end of a house, and a user enters the house through the opposite end, the user may walk 10-15 feet into the house before the handover to femtocell is triggered. This can lead to inaccurate billing and customer dissatisfaction. One solution is to employ a high-powered femtocell. However, the high-powered femtocell can cause interference and collect unwanted traffic from areas beyond the home.

Referring back to FIG. 5, system 500 utilizes Bluetooth-enabled femto access that accurately triggers a carrier rescan at UE 102, such that the FAP 106 can be identified as soon as the UE 102 enters the home. As discussed in detail supra, the Bluetooth client 104 can detect the Bluetooth modem 412 as soon as the UE 102 enters within Bluetooth range 414. In one example, Bluetooth pairing can be triggered by most any mechanism, for example, a door-mechanism. If Bluetooth pairing is successful, UE 102 can attach to the FAP 106 and update an alpha tag 504 on the UE 102, which is indicative of the communication network for the UE 102. In one aspect, the billing component 502 can monitor femto network usage by UE 102. Moreover, the billing component 502 can detect traffic to and/or from the FAP 106 and can accordingly update a billing database (not shown). The billing database can be accessed by an operator, service provider and/or user to determine network usage charges. In addition, the Bluetooth mechanism can also be employed to accurately detect when the UE 102 leaves the home and accordingly update the billing component 502 and/or alpha tag 504. It can be appreciated that although this example scenario relates to a FAP 106 deployed within a home, the subject specification is not so limited and the FAP 106 can be deployed in most any area, such as, but not limited to, an office, a store, a hotel, an apartment, a salon, a factory, etc.

Figure 6:
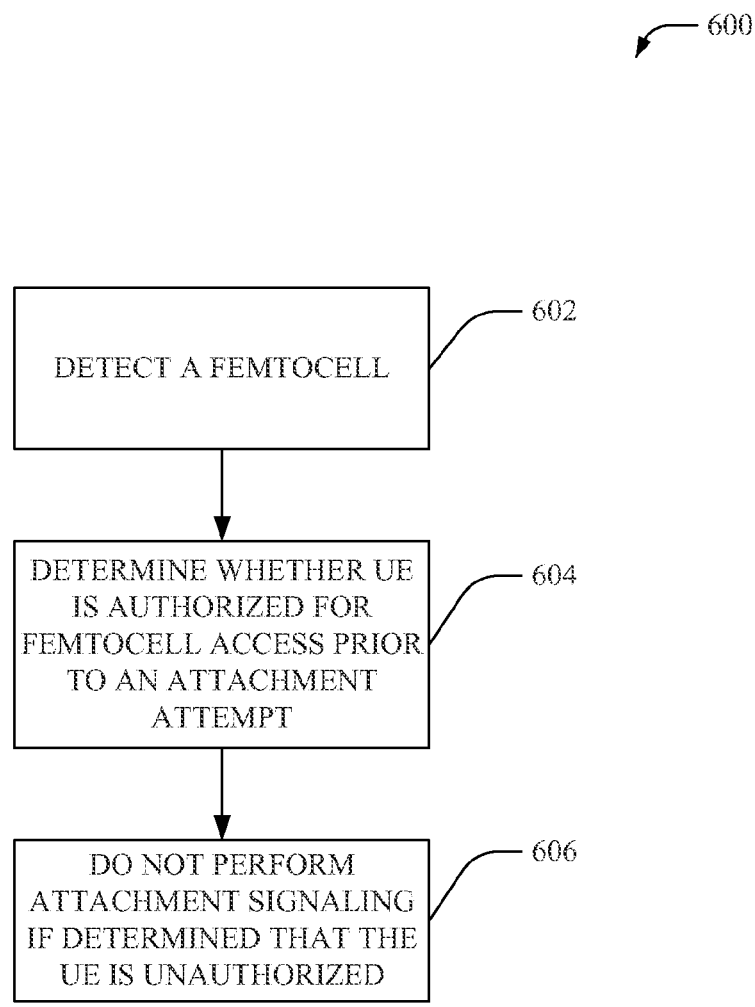
FIG. 6 illustrates an example methodology that can reduce attachment signaling and improve battery life of UEs.
Figure 7:
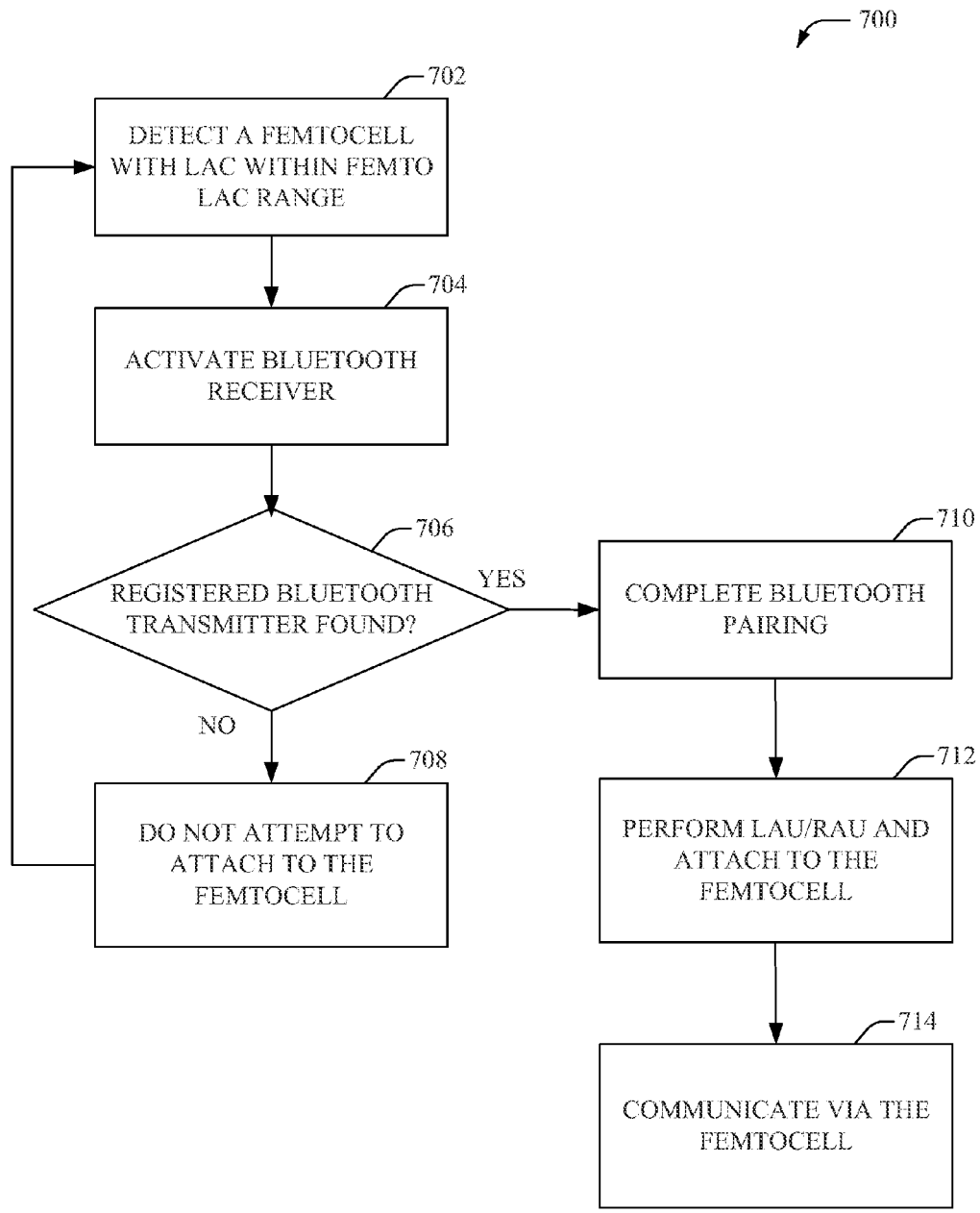
FIG. 7 illustrates an example methodology that can be utilized to provide Bluetooth-enabled femto access control.

FIGS. 6-7 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, storage media and/or communications media.

FIG. 6 illustrates an example methodology 600 that can reduce attachment signaling and improve battery life of UEs, in accordance with an aspect of the subject specification. Traditional femto access control and incoming handovers are signaling-intensive and limited in the number of unique AP identifiers available. Upon discovery of new FAP, the UE performs extensive signaling activity with various network elements before access is accepted or denied. In the case where access is denied the extensive signaling activity can amount to a significant overhead and can degrade network capacity and/or UE battery performance. In contrast, methodology 600 employs Bluetooth-based femto access control that triggers attachment signaling on successful Bluetooth pairing of a UE and a FAP, and thereby reduces signaling load and offers improved control over subscriber access to the FAP.

In one aspect, at 602, a femtocell can be detected. For example, the UE can identify a cell with a LAC that falls within a predefined FEMTO LAC range. At 604, it can be determined whether the UE is authorized for femtocell access, prior to an attachment attempt. In accordance with an aspect, in addition to the primary transmission technology, the FAP can also broadcast a Bluetooth identity (ID). The UE can receive this ID and employ the ID as a specific identifier for idle mode reselection and/or active mode handover behavior. Moreover, if the UE cannot establish Bluetooth pairing with the FAP, it can be determined that the UE is not authorized for femtocell access. Accordingly, at 606, attachment signaling is not performed if determined that the UE is unauthorized to utilize the femtocell. Thus, unnecessary macro/femto handover signaling is avoided.

Referring now to FIG. 7, illustrated is an example methodology 700 that can be utilized to provide Bluetooth-enabled femto access control, according to an aspect of the subject innovation. Typically, a FAP can include or can be operatively connected to a Bluetooth modem with a unique identifier (e.g., indicative of the FAP address or FAP owner's name, unique device ID, etc.). The Bluetooth modem can facilitate authorization of a UE, within the femtocell coverage area, prior to an attachment attempt made by the UE, by communicating over a Bluetooth protocol that operates in an unlicensed (e.g., 2.4 GHz) spectrum.

At 702, a femtocell with LAC within a femto LAC range can be detected. Typically, FAPs employ a specific LAC range, which can be pre-programmed into the UE as a FEMTO LAC range. On detection, at 704, the Bluetooth receiver (e.g., within the UE) can be activated. Further, the UE can scan for a registered Bluetooth transmitter, for example, based on the unique identifier of the FAP. As an example, when a UE is added to a whitelist of a FAP, a user can complete a Bluetooth registration (including password) from the UE towards the specific FAP Bluetooth modem.

At 706, it can be determined if a registered Bluetooth transmitter is found. If a registered Bluetooth transmitter is not found, then at 708, the UE will not attempt to attach and/or handover to the femtocell. As an example, in the idle mode case, the UE can implement modified selection/reselection behavior (e.g., ignore the carrier/LAC/SC combination). In the active mode case, the UE can implement modified neighbor measurement reporting behavior (e.g., report no measurements back to the served macro NodeB). Alternately, if a registered Bluetooth transmitter is found, at 710, the UE can complete Bluetooth pairing. At 712, when Bluetooth pairing is successful, LAU/RAU can be performed and the UE can attach to the femtocell. Further, at 714, the UE can communicate via the femtocell and incoming (or outgoing) voice and data traffic can be paged and routed to (or from) the UE through the FAP.

Figure 8:
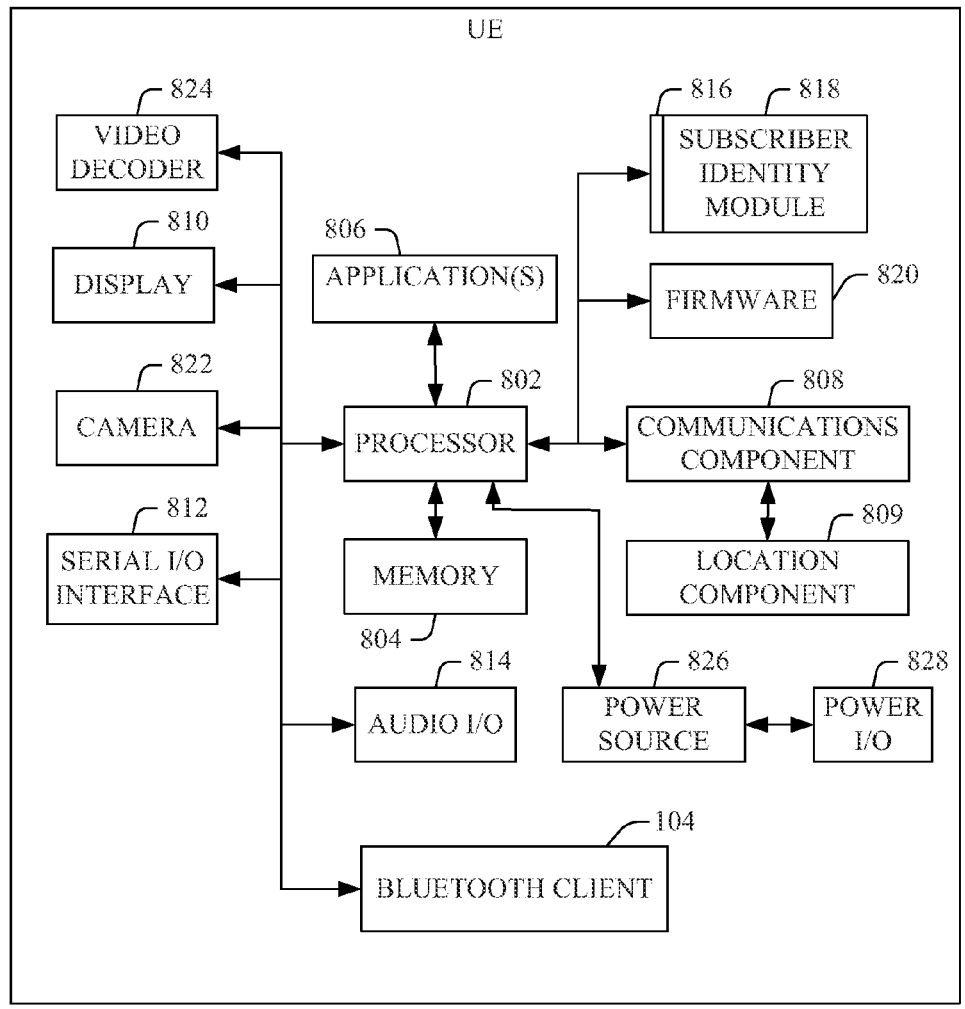
FIG. 8 illustrates a block diagram of a UE suitable for Bluetooth-enabled femto access control, in accordance with the innovation.

Referring now to FIG. 8, there is illustrated a block diagram of a UE 800 suitable for domain selection in accordance with the innovation. Moreover, UE 800 can be substantially similar to UE 102, 402, 404, and can include functionality, as more fully described herein with respect to UE 102, 402, and 404 in systems 100-500.

The UE 800 can include a processor 802 for controlling all onboard operations and processes. A memory 804 can interface to the processor 802 for storage of data and one or more applications 806 being executed by the processor 802. A communications component 808 can interface to the processor 802 to facilitate wired/wireless communication with external systems (e.g., femtocell and macro cell). The communications component 808 interfaces to a location component 809 (e.g., GPS transceiver) that can facilitate location detection of the UE 800. Note that the location component 809 can also be included as part of the communications component 808.

The UE 800 can include a display 810 for displaying content downloaded and/or for displaying text information related to operating and using the device features. As an example, the display 810 can render the alpha tag 504 to provide the user with the current communications network utilized by the UE 800. A serial I/O interface 812 is provided in communication with the processor 802 to facilitate serial communication (e.g., USB, and/or IEEE 1394) via a hard-wire connection. Audio capabilities are provided with an audio I/O component 814, which can include a speaker for the output of audio signals related to, for example, recorded data or telephony voice data, and a microphone for inputting voice signals for recording and/or telephone conversations.

The device 800 can include a slot interface 816 for accommodating a subscriber identity module (SIM) 818. Firmware 820 is also provided to store and provide to the processor 802 startup and operational data. The UE 800 can also include an image capture component 822 such as a camera and/or a video decoder 824 for decoding encoded multimedia content. The UE 800 can also include a power source 826 in the form of batteries, which power source 826 interfaces to an external power system or charging equipment via a power I/O component 828. In addition, the UE 800 can include a Bluetooth client 104, which can include respective functionality, as more fully described herein, for example, with regard to systems 100-500. Moreover, the Bluetooth client 104 can facilitate Bluetooth pairing with a FAP, prior to an attachment attempt, and perform attachment signaling only if the Bluetooth pairing is successful. Accordingly, the attachment signaling can be avoided if determined that UE 800 is not authorized to camp on the femtocell (e.g., based on the Bluetooth pairing) and battery life of the power system 828 can be conserved.

Figure 9:
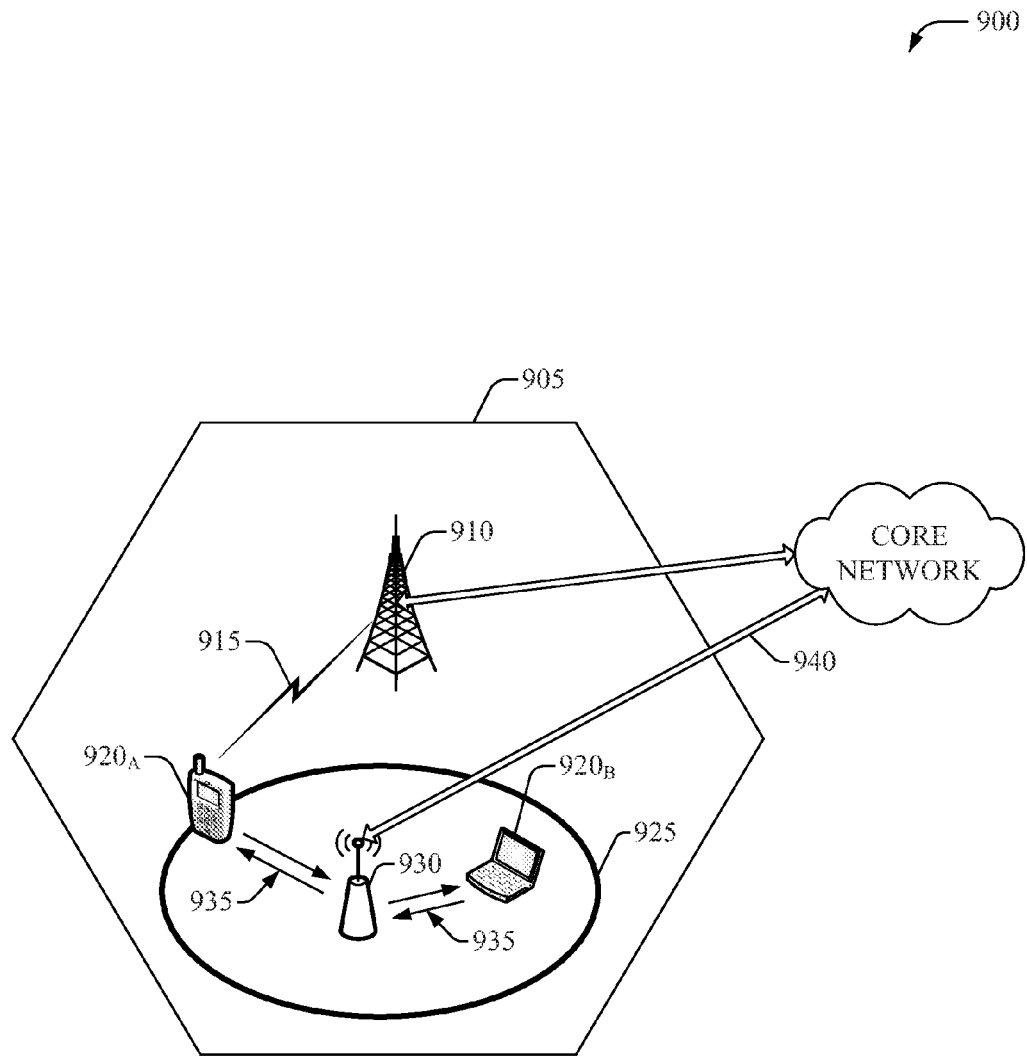
FIG. 9 illustrates an example wireless communication environment with associated components for operation of a femtocell in accordance with the subject specification.

FIG. 9 illustrates a schematic wireless environment 900 (e.g., a network) in which a femtocell can exploit various aspects of the subject innovation in accordance with the disclosed subject matter. In wireless environment 900, area 905 can represent a coverage macro cell, which can be served by base station 910. Macro coverage is generally intended for outdoors locations for servicing mobile wireless devices, like UE $920_A$, and such coverage is achieved via a wireless link 915. In an aspect, UE 920 can be a 3GPP Universal Mobile Telecommunication System (UMTS) mobile phone.

Within macro coverage cell 905, a femtocell 925, served by a femto access point 930, can be deployed. A femtocell typically can cover an area 925 that is determined, at least in part, by transmission power allocated to femto AP 930, path loss, shadowing, and so forth. Coverage area typically can be spanned by a coverage radius that ranges from 20 to 50 meters. Confined coverage area 925 is generally associated with an indoors area, or a building, which can span about 5000 sq. ft. Generally, femto AP 930 typically can service a number (e.g., a few or more) wireless devices (e.g., subscriber station $920_B$) within confined coverage area 925. In an aspect, femto AP 930 can integrate seamlessly with substantially any PS-based and CS-based network; for instance, femto AP 930 can integrate into an existing 3GPP Core via conventional interfaces like Iu-CS, Iu-PS, Gi, Gn. In another aspect, femto AP 930 can exploit high-speed downlink packet access in order to accomplish substantive bitrates. In yet another aspect, femto AP 930 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 920$_A$, leaves macro coverage (e.g., cell 905) and enters femto coverage (e.g., area 925), as illustrated in environment 900, a carrier frequency scan can be triggered by the UE 920$_A$, which can detect the femto AP 930. Moreover, a Bluetooth receiver in the subscriber station can be switched on and Bluetooth pairing can be performed with a Bluetooth modem of femto AP 930. If Bluetooth pairing is successful, UE 920$_A$ can attempt to attach to the femto AP 930 through transmission and reception of attachment signaling, effected via a FL/RL 935; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 920 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 930) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if Bluetooth pairing is not successful, UE 920 does not attempt to attach to femto AP 930. UE 920 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful (e.g., after Bluetooth pairing), UE 920 can be allowed on femtocell 925, and incoming voice and data traffic can be paged and routed to the subscriber station through the femto AP 930. It is to be noted also that data traffic is typically routed through a backhaul broadband wired network backbone 940 (e.g., optical fiber backbone, twisted-pair line, T1/E1 phone line, DSL, or coaxial cable). It is to be noted that as a femto AP 930 generally can rely on a backhaul network backbone 940 for routing and paging, and for packet communication, substantially any quality of service can handle heterogeneous packetized traffic. Namely, packet flows established for wireless communication devices (e.g., terminals 920$_A$ and 920$_B$) served by femto AP 930, and for devices served through the backhaul network pipe 940. It is to be noted that to ensure a positive subscriber experience, or perception, it is desirable for femto AP 930 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 925).

Figure 10:
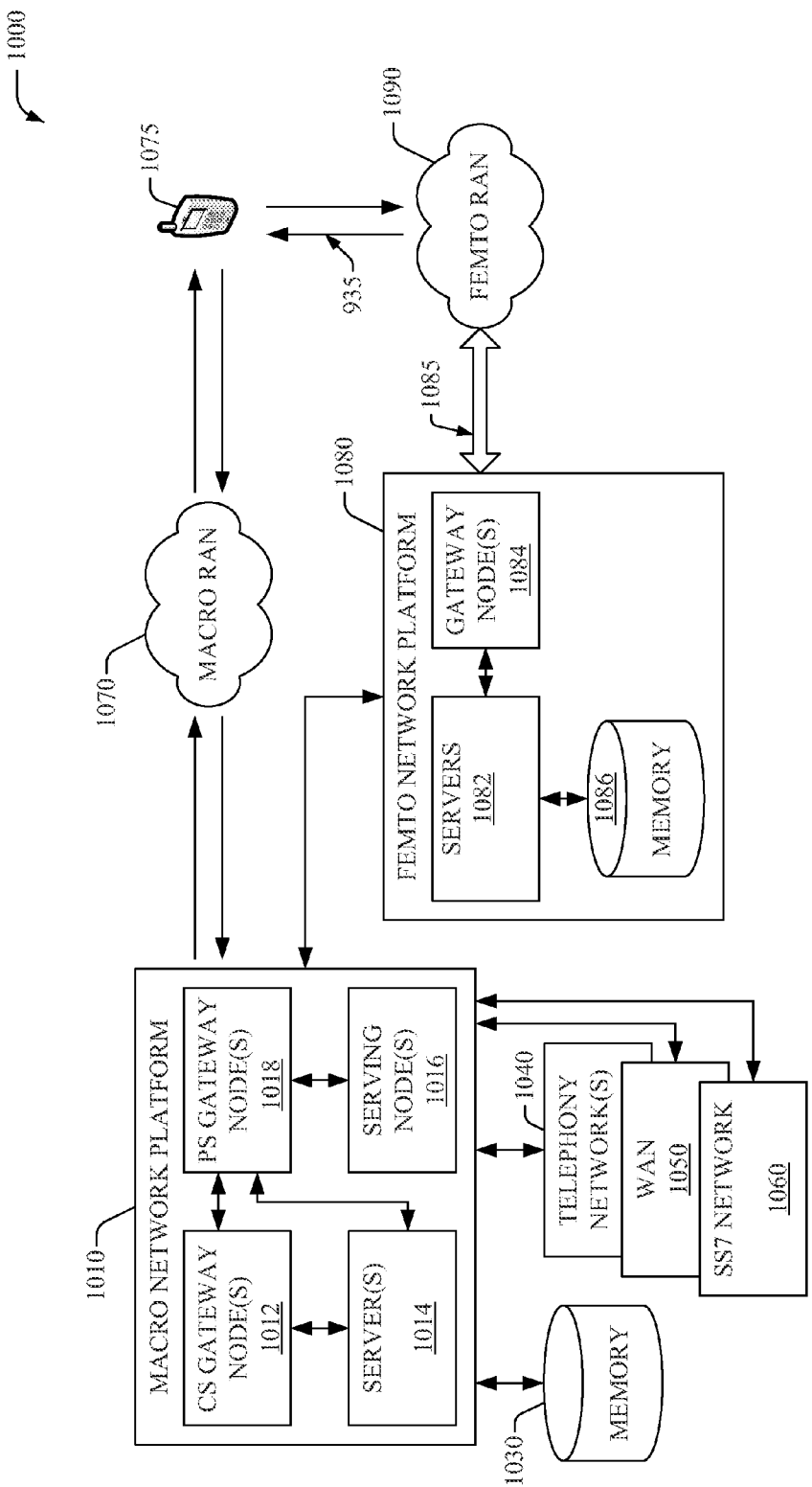
FIG. 10 illustrates a schematic deployment of a macro cell and a femtocell for wireless coverage in accordance with aspects of the disclosure.
Figure 11:
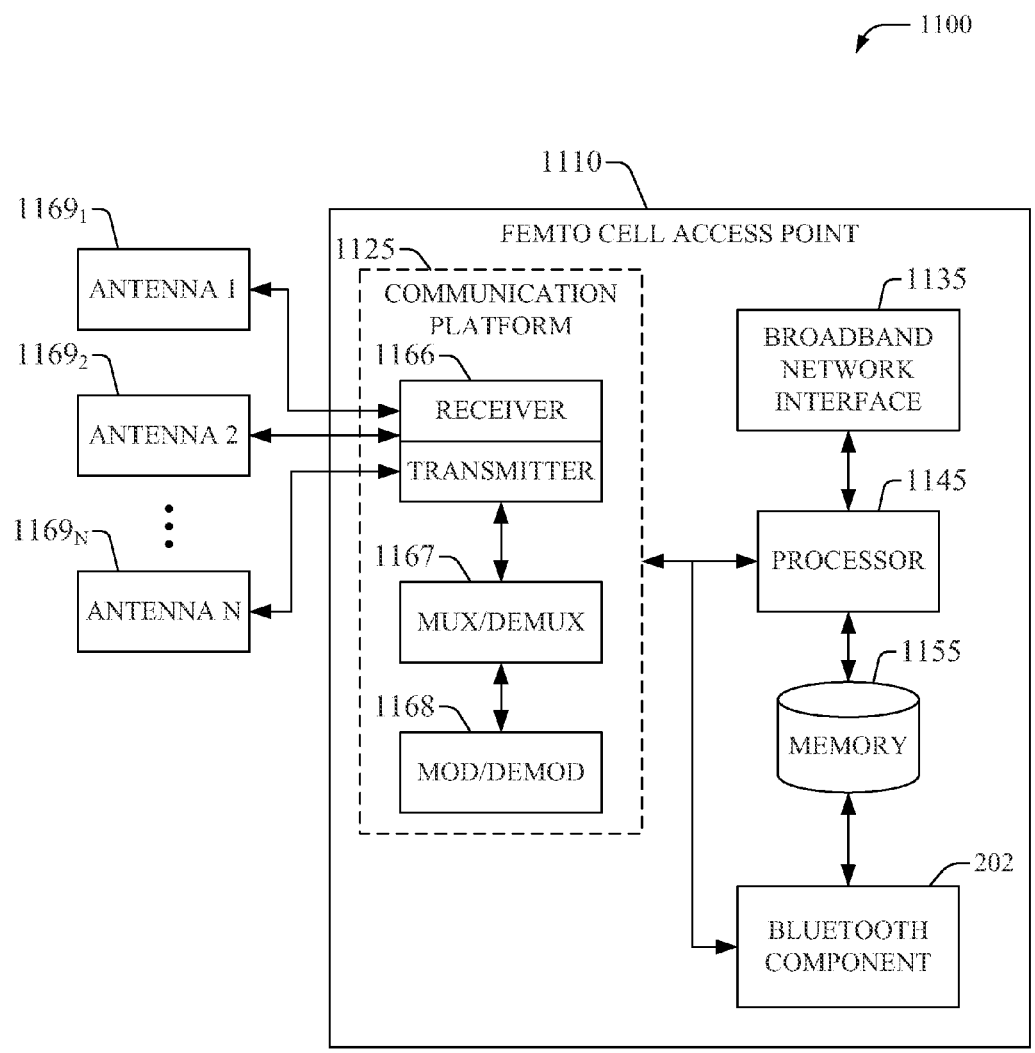
FIG. 11 illustrates an example embodiment of a femto access point that can facilitate Bluetooth-enabled femto access control, according to the subject disclosure.

To provide further context for various aspects of the subject specification, FIGS. 10 and 11 illustrate, respectively, an example wireless communication environment 1000, with associated components for operation of a femtocell, and a block diagram of an example embodiment 1100 of a femto access point, which can facilitate Bluetooth-enabled femto access control in accordance with aspects described herein.

Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 940. It should be appreciated that femto network platform 1080 typically offloads UE 1075 from macro network, once UE 1075 attaches (e.g., after successful Bluetooth pairing through macro-to-femto handover or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1005, while femto RAN 1090 can comprise multiple femtocell access points. According to an aspect, the femtocell access points can be operatively coupled to Bluetooth modems to facilitate Bluetooth pairing with UEs. As mentioned above, it is to be appreciated that deployment density in femto RAN 1090 is substantially higher than in macro RAN 1070.

Generally, both macro and femto network platforms 1010 and 1080 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Moreover, CS gateway node(s) 1012 interfaces CS-based traffic and signaling and gateway node(s) 1018.

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. It should be further appreciated that the packetized communication can include multiple flows that can be generated through server(s) 1014. Macro network platform 1010 also includes serving node(s) 1016 that convey the various packetized flows of information, or data streams, received through gateway node(s) 1018. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Server(s) 1082 have substantially the same functionality as described in connection with server(s) 1014 and can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femtocell configuration (e.g., devices served through femto RAN 1090; access control lists, or white lists); service policies and specifications; privacy policies; add-on features; and so forth.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1110 also includes a processor 1145 configured to confer functionality, at least partially, to substantially any electronic component in the femto access point 1110, in accordance with aspects of the subject innovation. In particular, processor 1145 can facilitate femto AP 1110 to implement configuration instructions received through communication platform 1125, which can include storing data in memory 1155. In addition, processor 1145 facilitates femto AP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by femto AP; and exploit substantially any other advantages associated with smart-antenna technology. Memory 1155 can store access control lists, data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; femto AP address(es) or geographical indicator(s); access control lists (e.g., white lists); license(s) for utilization of add-features for femto AP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. The femto AP 1110 can further include (or be operatively coupled to) a Bluetooth component 202, which can include functionality, as more fully described herein, for example, with regard to systems 200, 300, 400, and 500. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
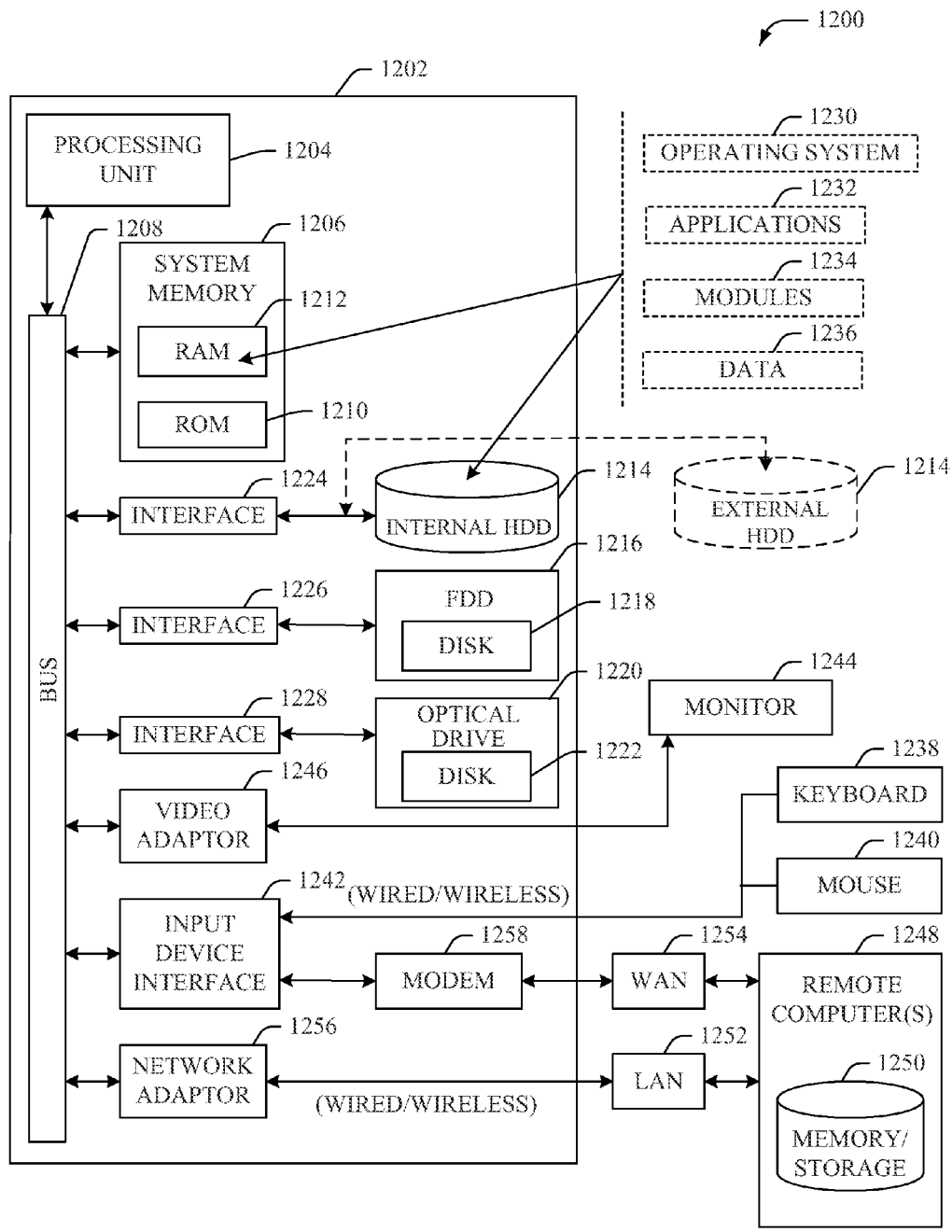
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and media accommodate the storage of any data in a suitable digital format. Although the description of computer-readable storage media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
a processor; and
a memory that stores executable instructions, that when executed by the processor, facilitate performance of operations, comprising:
  facilitating an active communication session via a first coupling between the user equipment and a macro access point device of a network;
  subsequent to the user equipment entering a coverage area associated with a femto access point device of the network, initiating a Bluetooth pairing between the user equipment and a Bluetooth interface of the femto access point device prior to initiating attachment signaling to couple with the femto access point device via a cellular radio link, wherein the Bluetooth pairing comprises a process to establish a Bluetooth link between the user equipment and the femto access point device, in response to detecting that the Bluetooth link has been established and prior to transmitting communication data via the Bluetooth link:

employing a first result of the Bluetooth pairing as a first verification that the user equipment is authorized to access the femto access point device via the cellular radio link, wherein the attachment signaling is initiated in response to the determining that the user equipment is authorized to access the femto access point device, facilitating a transfer of the first coupling to a second coupling between the user equipment and the femto access point device, wherein subsequent to the transfer, wherein the second coupling is utilized to facilitate the active communication session, and subsequent to the transfer, updating alpha tag data to indicate that a billing rate associated with the femto access point device is to be utilized to determine a fee associated with the active communication session, and in response to detecting that the Bluetooth link has failed to be established:

employing a second result of the Bluetooth pairing as a second verification that the user equipment is not authorized to access the femto access point device via the cellular radio link, wherein a transmission of the attachment signaling is prohibited in response to the determining that the user equipment is not authorized to access the femto access point device, and wherein the active communication session is continued to be performed via the first coupling.

2. The user equipment of claim 1, wherein the operations further comprise:

facilitating a scan to detect a Bluetooth transmitter associated with the Bluetooth interface.

3. The user equipment of claim 2, wherein the operations further comprise:

in response to a detection of the Bluetooth transmitter, initiating a carrier rescan.

4. The user equipment of claim 1, wherein the billing rate is a first billing rate that is less than a second billing rate associated with the macro access point device.

5. The user equipment of claim 4, wherein the operations further comprise:

in response to the determining that the Bluetooth pairing between the user equipment and the Bluetooth interface has been disconnected, updating the alpha tag data to indicate that the second billing rate assigned to the macro access point device is to be utilized for subsequent communication associated with the user equipment.

6. The user equipment of claim 1, wherein the initiating the Bluetooth pairing comprises initiating the Bluetooth pairing based on credential data associated with the user equipment.

7. The user equipment of claim 6, wherein the credential data comprises information indicative of a passkey that facilitates the Bluetooth pairing.

8. The user equipment of claim 6, wherein the credential data comprises location information indicative of a geographical location of the femto access point device that is employable to establish the Bluetooth pairing.

9. A non-transitory machine-readable storage medium comprising executable instructions that, when executed by a processor of a user equipment facilitate performance of operations, comprising:

determining that the user equipment has entered a coverage area associated with a femto access point device of a network during an active communication session being performed via a first coupling between the user equipment and a macro access point of the network;

subsequent to the determining and prior to initiating attachment signaling that is employable to couple the user equipment with the femto access point device via a cellular radio connection, initiating a Bluetooth pairing between the user equipment and a Bluetooth interface of the femto access point device, wherein the Bluetooth pairing comprises a process to establish a Bluetooth link between the user equipment and the femto access point device;

in response to detecting that the Bluetooth link has been established and prior to transmitting communication data via the Bluetooth link, utilizing a first result of the Bluetooth pairing to verify that the user equipment is authorized to communicate via the femto access point device via the cellular radio connection and initiating the attachment signaling to facilitate a transfer of the first coupling to a second coupling between the user equipment and the femto access point device, wherein, subsequent to the transfer, the second coupling is utilized to facilitate the active communication session and alpha tag data is updated to indicate that a billing rate associated with the femto access point device is to be utilized for a determination of a fee associated with the active communication session; and in response to detecting that the Bluetooth pairing has failed to be established, utilizing a second result of the Bluetooth pairing to verify that the user equipment is not authorized to communicate via the femto access point device via the cellular radio connection and denying the initiating of the attachment signaling, wherein, in response to the denying, the active communication session is continued to be performed via the first coupling.

10. The non-transitory machine-readable storage medium of claim 9, wherein the initiating the Bluetooth pairing comprises initiating the Bluetooth pairing by employing credential data stored within a data store of the user equipment.

11. The non-transitory machine-readable storage medium of claim 9, wherein the operations further comprise:

as a function of the alpha tag data being updated, facilitating a utilization of the billing rate for the determination of the fee.

12. The non-transitory machine-readable storage medium of claim 11, wherein the billing rate is a first billing rate, the utilization is a first utilization, and the operations further comprise:

in response to the determining that the Bluetooth pairing has been terminated, modifying the alpha tag data to represent the first coupling; and as a function of the modifying, facilitating a second utilization of a second billing rate assigned to the macro access point device for the determination of the fee.

13. The non-transitory machine-readable storage medium of claim 10, wherein the credential data comprises information indicative of a password that facilitates the Bluetooth pairing.

14. The non-transitory machine-readable storage medium of claim 10, wherein the credential data comprises address information indicative of an address of the femto access point device.

15. The non-transitory machine-readable storage medium of claim 10, wherein the credential data comprises subscriber data associated with the femto access point device.

16. The non-transitory machine-readable storage medium of claim 10, wherein the operations further comprise:
receiving, during a network scan, location area code data indicative of a location area code assigned to the femto access point device; and
in response to determining that the location area code is within a defined location area code range that is reserved for femto access point devices, activating a Bluetooth receiver to initiate the Bluetooth pairing.

17. A method, comprising:
determining, by a user equipment comprising a processor, that the user equipment has entered a coverage area associated with a femto access point device of a network during an active communication session being performed via a first coupling between the user equipment and a macro access point of the network;
subsequent to the determining and prior to communicating attachment data for coupling the user equipment to the femto access point device by employing a cellular radio access technology, facilitating, by the user equipment, establishment of a Bluetooth pairing with a Bluetooth modem of the femto access point device, wherein the Bluetooth pairing comprises a process that configures a Bluetooth link between the user equipment and the femto access point device;
in response to the Bluetooth link being determined to have been established and prior to transmitting communication data via the Bluetooth link, utilizing, by the user equipment, a first result of the Bluetooth pairing to confirm that a communication with the femto access point device by employing the cellular radio access technology is authorized and allowing, by the user equipment, a transmission of the attachment data to the femto access point device to facilitate a transfer of the first coupling to a second coupling between the user equipment and the femto access point device, wherein, subsequent to the transfer, the second coupling is utilized to facilitate the active communication session and alpha tag data is updated to indicate that a billing rate associated with the femto access point device is to be utilized to determine a fee associated with the active communication session; and
in response to the Bluetooth pairing being determined to have been failed, utilizing, by the user equipment, a second result of the Bluetooth pairing to confirm that the communication with the femto access point device by employing the cellular radio access technology is not authorized and denying the transmission of the attachment data, wherein the active communication session is continued to be performed via the first coupling in response to the denying.

18. The method of claim 17, wherein the facilitating the establishment comprises facilitating the establishment by employing credential data associated with the user equipment.

19. The method of claim 17, wherein the facilitating the establishment comprises facilitating the establishment by employing information indicative of a passkey.

20. The method of claim 17, wherein the facilitating the establishment comprises facilitating the establishment by employing location information indicative of a location of the femto access point device.

* * * * *